United States Patent [19]
Chappell

[11] 4,079,648
[45] Mar. 21, 1978

[54] MITER ATTACHMENT

[76] Inventor: Robert Chappell, 975 26th St., Allegan, Mich. 49010

[21] Appl. No.: 733,535

[22] Filed: Oct. 18, 1976

[51] Int. Cl.² ............................................. B27B 9/04
[52] U.S. Cl. .................................. 83/490; 83/471.2; 83/483; 83/477.2
[58] Field of Search ...................... 83/490, 483, 471.3, 83/471.2, 477.2, 574

[56] References Cited

U.S. PATENT DOCUMENTS

| | | | |
|---|---|---|---|
| 3,078,885 | 2/1968 | Burch | 83/490 |
| 3,410,324 | 11/1968 | Thompson | 83/441.1 |
| 3,454,055 | 7/1969 | Schnettler | 83/490 |
| 3,602,987 | 9/1971 | Miller | 83/471.2 |

*Primary Examiner*—Donald R. Schran

[57] ABSTRACT

A miter attachment for use with a portable electric circular saw. This miter attachment has a smooth upper platform secured to rails positioned at 90°, and at 45° right and left which are also secured to the base. A portable saw is placed on the upper platform with the circular blade in the marked pre-cut saw groove for true miter cutting. The saw shoe is fixed in position by clamps and the user releases the elevation knob on the saw, allowing it to move freely up and down on a pin hinged to the saw shoe. A plunge cut is achieved as the saw is lowered and the blade passes through the workpiece, placed and held against the rail between the upper platform and the base.

1 Claim, 6 Drawing Figures

MITER ATTACHMENT

SUMMARY OF INVENTION

This invention relates to a miter box for use with a portable electric circular saw. Specifically designed and sturdily constructed, this miter attachment is practical, very efficient, and an asset to the finish carpenter for trim work such as molding for doors, windows, walls, etc. With saw attached this miter device can be carried with one hand to the immediate working site.

The construction of this miter attachment allows a circular saw to be fixed for plunge cutting. The saw can be mounted on the miter box, ready to use, in less than a minute. The plunge cutting of a workpiece has the distinct advantage of a clean and true finish cut every time. Because the saw is in a fixed position on the miter box, this device can be placed on a table, floor, or any flat surface, ready to use without clamping. This invention provides a much safer miter attachment than previous inventions whereas the power saw slies along a guide.

These and other features of this invention will become apparent from the following description in conjunction with the drawings furnished.

DETAILED DESCRIPTION OF THE DRAWINGS

Figure 1:
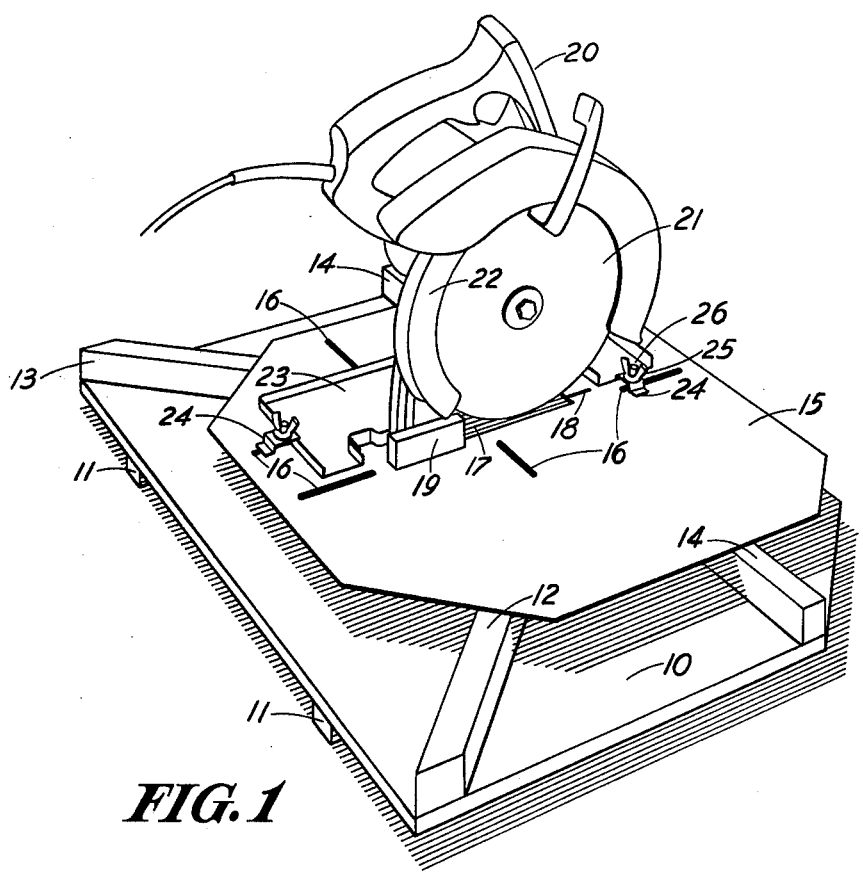
FIG. 1 is a perspective view of the miter attachment with a power saw mounted in position ready for cutting.

Referring to the drawings FIG. 1 shows the circular saw 20 mounted in position on upper platform 15. Upper platform 15, having planar surfaces top and bottom, is supported and secured with nails or screws, and glued to rails 12, 13 and 14. These rails are secured in the same manner to the base 10. Base 10 is mounted on two supports to allow sufficient space under the miter box for reasons explained later.

Figure 5:
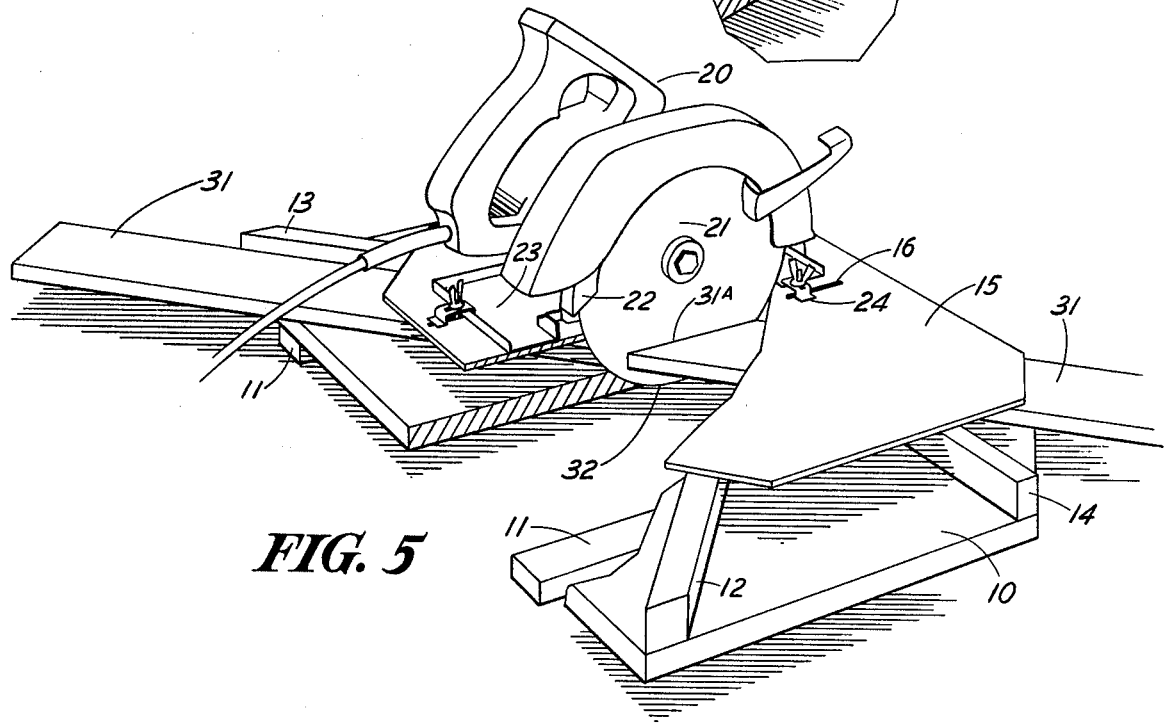
FIG. 5 is a perspective sectional view with workpiece in position.

To position the circular saw 20 on the upper platform 15, the saw blade 21 should be in the lowest position FIG. 5 and placed in marked pre-cut saw groove 18. The two clamps 24 are placed over the edge of the saw shoe 23 and the wing nuts 25 are hand tightened to secure the saw 20 in a fixed position ready for plunge cutting. FIG. 1, with saw 20 in raised position, shows saw blade guard 22 resting on guard block 19 which is fastened to upper platform 15 with screws and glue. With block 19 so positioned, the safety guard 22 functions properly at all times.

Figure 2:
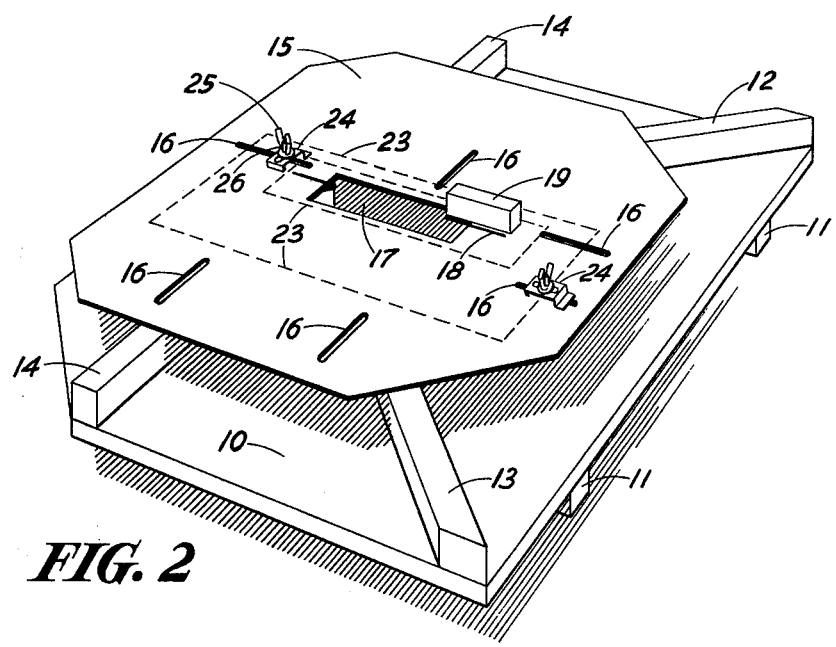
FIG. 2 is a perspective view illustrating the complete invention.

FIG. 2 is a perspective drawing of the invention showing the only movable parts, two clamps 24, two bolts 26, and two wing nuts 25. The dotted line areas 23 on platform 15 represent a saw shoe, open type, or closed. The many sizes of saw shoes on different makes of circular saws are accomodated by the cut out slots 16 positioned for mounting any of the various sizes. The clamps 24, bolts 26, and the wing nuts 25, can be placed in any of six cut out slots 16 to secure the user's particular saw to the miter box. The upper platform 15 has a rectangular cut out 17 for viewing the area where the workpiece is to be cut.

Figure 3:
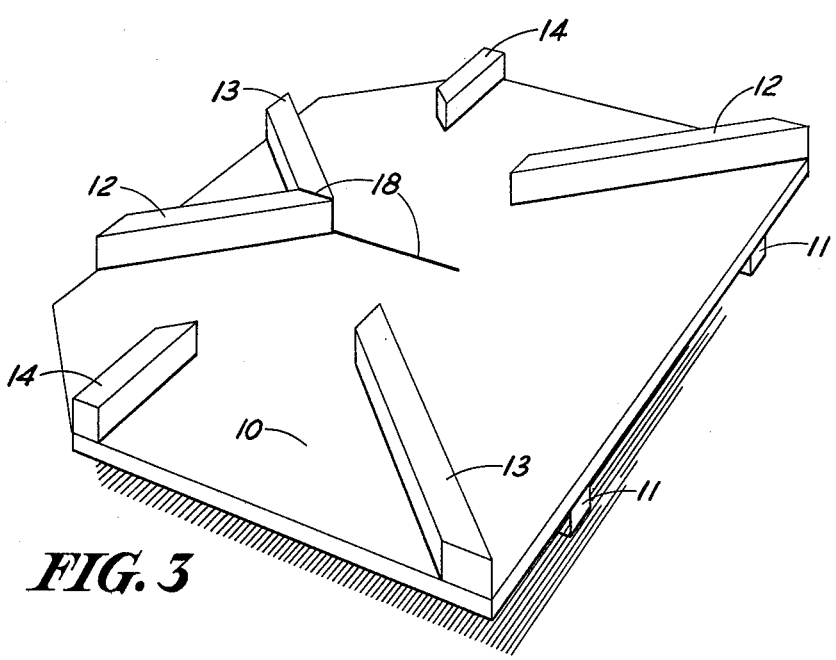
FIG. 3 is a perspective view with upper platform removed to show the under structure.

FIG. 3 is pictured with the upper platform 15 removed to show the construction of the rails 12, 13, and 14 attached to the base 10. This view also shows the lower part of the pre-cut saw groove 18.

Figure 4:
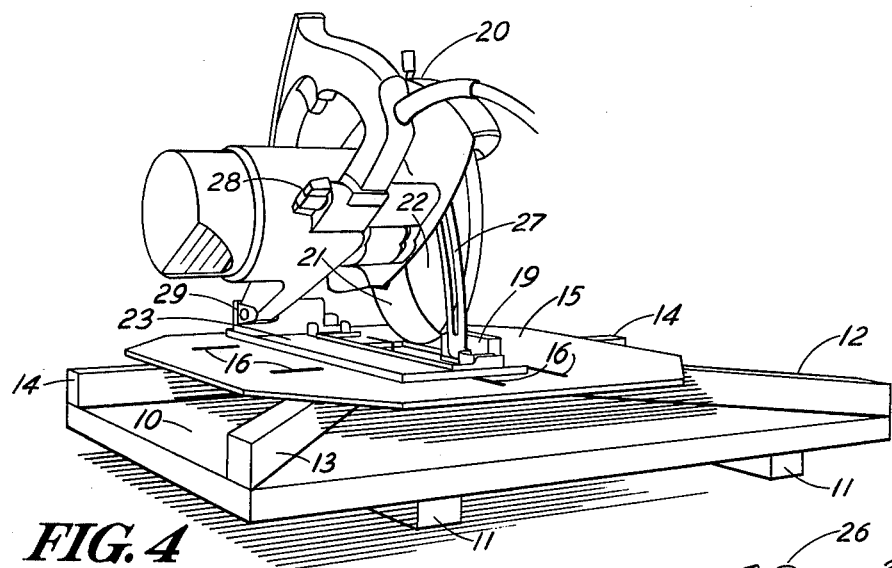
FIG. 4 is a perspective view ezplaining the plunge cut.

FIG. 4 shows how a circular saw can be used for plunge cutting. The saw is constructed so that the bottom of the saw blade 21 can be raised to the saw shoe 23 level by releasing a knob 28. This in turn releases a bolt head in the groove of bracket 27. By leaving knob 28 loose, the saw 20 can be freely moved up or down while saw shoe is secured. The saw 20 if fastened to the saw shoe bracket by a pin 29 acting as a hinge.

FIG. 5 features the cutting of a workpiece 31 held by the left hand firmly against the rail 13. The right hand lowers the saw 20 for a neat miter cut at point 31A, or the left hand operates the saw 20 as the right hand holds the workpiece against the rail 12. The ease of operating the saw safely with either hand is possible only because of the fixed position of the saw shoe 23. The upper platform 15 is designed to allow ample space for hand holding the workpiece. The two supports 11 are fastened to the underside of base 10 to allow ample space for clearing of saw blade 21 at point 32.

Figure 6:
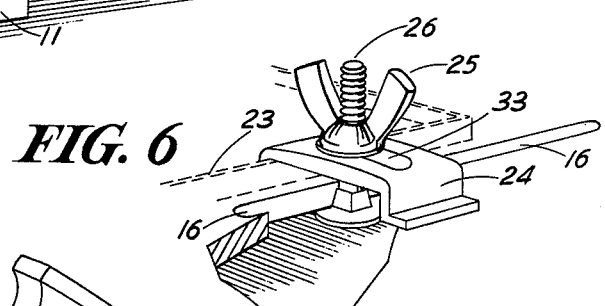
FIG. 6 is a perspective sectional blow-up of the hardware securing the saw shoe.

FIG. 6 is a sectional blow-up view showing the saw shoe 23 clamped to the upper platform 15. Two of these metal clamps 24 will secure any power circular saw shoe 23 to the upper platform 15 with bolts 26, and wingnuts 25. Bolts 26 fit in any of the slots 16. Clamps 24 have a slot 33 to accomodate clamping over the edge of any make of saw shoe. Flat or raised edges can be clamped down firmly to the upper platform 15 with clamp.

The heigth between the upper platform and base in this specification is determined by the popular 7 inch or 7¼ inch size portable circular saw.

Modification of the foregoing is possible, and may be desirable, within the scope of the invention as claimed.

I claim:

1. A miter attachment comprising a platform having cut out slots so arranged that a portable power circular saw with closed or open shoe may be temporarily clamped in a fixed position allowing user to cut a workpiece with a downward movement of said saw, said platform having a specific arrangement of guides beneath and directly connected to said platform having said guides also connected to the surface of a base, said base being larger than said platform with said guides extending to the edges of said base allowing user ample space on said guides for hand holding a workpiece, said platform having an opening for viewing of cutting site, said platform having a precut saw groove perpendicular to front of said platform and extending downward through base, one set of said guides being parallel with front of said platform and the remaining guides arranged in a configuration of an isosceles right triangle in relation with path of said saw, said platform having an attached small block to allow saw blade guard to function properly.

* * * * *